United States Patent
Hyndman et al.

(10) Patent No.: US 9,392,037 B2
(45) Date of Patent: Jul. 12, 2016

(54) METHOD AND APPARATUS FOR RECONSTRUCTING A COMMUNICATION SESSION

(75) Inventors: Arn Hyndman, Ottawa (CA); Nicholas Sauriol, Ottawa (CA)

(73) Assignee: Avaya Inc., Basking Ridge, NJ (US)

( * ) Notice: Subject to any disclaimer, the term of this patent is extended or adjusted under 35 U.S.C. 154(b) by 24 days.

(21) Appl. No.: 12/344,550

(22) Filed: Dec. 28, 2008

(65) Prior Publication Data

US 2009/0240818 A1    Sep. 24, 2009

Related U.S. Application Data

(60) Provisional application No. 61/037,447, filed on Mar. 18, 2008.

(51) Int. Cl.
*G06F 15/16*    (2006.01)
*H04L 29/06*    (2006.01)
*H04M 3/42*    (2006.01)

(52) U.S. Cl.
CPC ............ *H04L 65/4015* (2013.01); *H04L 67/38* (2013.01); *H04M 3/42221* (2013.01); *H04M 2201/22* (2013.01); *H04M 2203/301* (2013.01)

(58) Field of Classification Search
CPC ......................... H04M 1/656; H04M 3/42221
USPC ................................................. 709/228, 204
See application file for complete search history.

(56) References Cited

U.S. PATENT DOCUMENTS

| | | | |
|---|---|---|---|
| 5,550,966 A | 8/1996 | Drake et al. | |
| 5,668,863 A | 9/1997 | Bieselin et al. | |
| 6,298,129 B1 | 10/2001 | Culver et al. | |
| 6,766,000 B2 | 7/2004 | Squibbs et al. | |
| 6,778,639 B2 | 8/2004 | Gusler et al. | |
| 6,850,609 B1 | 2/2005 | Schrage | |
| 6,993,120 B2 | 1/2006 | Brown et al. | |
| 7,227,930 B1 * | 6/2007 | Othmer et al. | 379/85 |
| 7,349,944 B2 | 3/2008 | Vernon et al. | |

(Continued)

FOREIGN PATENT DOCUMENTS

WO    WO 02/25889    3/2002

OTHER PUBLICATIONS

Written Opinion of the International Searching Authority from corresponding PCT application PCT/CA2009/000328.

(Continued)

*Primary Examiner* — Esther B Henderson

(57) ABSTRACT

Each person to a communication session records their contributions to the communication session. Metadata is maintained for each contribution to identify the time of the contribution and any other useful information to enable the content of the contribution to be accessed at a later point in time. When a portion of the communication session is to be recreated, the people involved in the communication session are requested to provide their contributions for a particular period of time or all contributions associated with a particular topic. Users will then select and forward previously recorded contributions that they are willing to have included in the recreation. By collecting contributions from the individuals involved in the communication session, the intended portion of the communication session may be recreated. Since each person is recording their own contribution to the communication session, no explicit permission is required to record the conversation.

18 Claims, 4 Drawing Sheets

(56) References Cited

U.S. PATENT DOCUMENTS

| | | |
|---|---|---|
| 7,466,334 B1 | 12/2008 | Baba |
| 7,548,609 B2 * | 6/2009 | Rao et al. .................. 379/68 |
| 7,707,262 B1 * | 4/2010 | Bill .............................. 709/207 |
| 7,738,638 B1 * | 6/2010 | Henderson ................ 379/88.17 |
| 2002/0067810 A1 | 6/2002 | Barak et al. |
| 2005/0018622 A1 * | 1/2005 | Halbraich et al. ............ 370/260 |
| 2005/0226395 A1 * | 10/2005 | Benco et al. .................... 379/85 |
| 2006/0200520 A1 * | 9/2006 | Vernon et al. ................ 709/204 |
| 2006/0233321 A1 | 10/2006 | Barker et al. |
| 2007/0211876 A1 * | 9/2007 | Othmer et al. ........... 379/201.01 |
| 2008/0005347 A1 | 1/2008 | Ott |
| 2008/0267363 A1 * | 10/2008 | Pickett .......................... 379/85 |

OTHER PUBLICATIONS

Search Report from corresponding EP patent application EP 09727133.5.

* cited by examiner

METHOD AND APPARATUS FOR RECONSTRUCTING A COMMUNICATION SESSION

CROSS-REFERENCE TO RELATED APPLICATIONS

This application claims priority to U.S. Provisional Patent Application No. 61/037,447, filed Mar. 18, 2008, entitled "Method and Apparatus For Providing 3 Dimensional Audio on a Conference Bridge", the content of which is hereby incorporated herein by reference.

BACKGROUND OF THE INVENTION

1. Field of the Invention

The present invention relates to recording of live events and, more particularly, to a method and apparatus for reconstructing a communication session.

2. Description of the Related Art

People communicate with each other in many ways. Although some communication takes place in face-to-face meetings, more frequently people may communicate with each other over a network. For example, a network may carry written communication such as email and text messages, and also may carry audio communication such as a telephone or video telephone call. Most audio/video communication takes place live, which means that as people talk the audio produced is directly conveyed to the other participants. Many ways have been developed for people to speak with each other digitally over a communication network.

It often would be advantageous to record live communication sessions, such as telephone calls, video telephone calls, telephone conferences, etc. However, many states have laws against recording such telephone calls without consent. Thus, if a person would like to record a telephone conversation, the person may be required to notify the other person that the conversation is being recorded and receive their explicit consent to the recording. This process may be awkward, particularly where people are joining and leaving the telephone call over time. Additionally, obtaining consent to have a communication session recorded may alter people's behavior on the communication session and make the communication session less productive, since the people may not feel comfortable being candid about particular issues if they know that the communication session is being recorded. Thus the fact that the communication session is being recorded may negatively affect the productivity of the conversation by inhibiting people from speaking freely.

If the communication session is not recorded, people will need to plan ahead to enable the substance of the communication session to be documented. For example, one person may be designated to take notes during the meeting and preserve a record of the substance of the meeting. The person that takes the notes, or someone working with that person, will then write formal minutes of the meeting. This process may be time consuming for the person tasked with keeping notes, and the quality of the end product is largely dependent on the note taking skill of the person assigned the note-taking task. Additionally, in many instances, no one is assigned the task of keeping notes. In these situations, the only thing that remains after the telephone conversation has ended is the recollection of the people involved. Accordingly, it would be advantageous to record the communication sessions such as telephone and video teleconference based communication sessions without obtaining a-priori consent from the participants.

SUMMARY OF THE INVENTION

A method and apparatus for reconstructing a communication session enables the content of the communication session to be recreated without requiring the parties to consent, before-hand, to having the communication session recorded. According to one embodiment, each person to a communication session records only their own contributions to the communication session. Each time the user speaks, their contribution will be automatically recorded as a chunk of audio data, or audio segment, and stored in a rolling buffer file. No explicit user input is required to manage the recording or determine where to store the file. In addition, voice activity detection may be used to determine when a person is speaking to automatically trigger recording of an audio segment. Metadata is maintained for each audio segment to identify the time of the audio segment and any other useful information to enable the content of the audio segment to be accessed at a later point in time. Metadata may be automatically generated or input by the user.

Recording of the user's contributions may be performed locally by the user or may be performed on the user's behalf via a network service. Where the local device in use by the user supports local file creation and web access, the local device itself may record the audio segments. Any phone, such as a cell phone, telephone handset, or computer telephony application, may be used to record user contributed audio segments. Where the local device does not have these recording capabilities, or where the user would prefer that the recording be performed by another device, a network-based recording service may be used to record the user's contributions. Since each person is recording their own contribution to the communication session, no explicit permission is required to record the conversation.

When a portion of the communication session is to be recreated, the people involved in the communication session will be requested to provide their contributions for a particular period of time or all contributions associated with a particular topic. Users can then elect to provide all or some of their audio segments. By collecting the contributions from the individuals involved in the communication session during the period of time or for the particular topic, the intended portion of the communication session may be recreated. Not all contributions need to be contributed to recreate the intended portion of the communication session as users may elect to not provide particular contributions. The contributions from multiple users will be combined to enable the communication session to be at least partially recreated.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
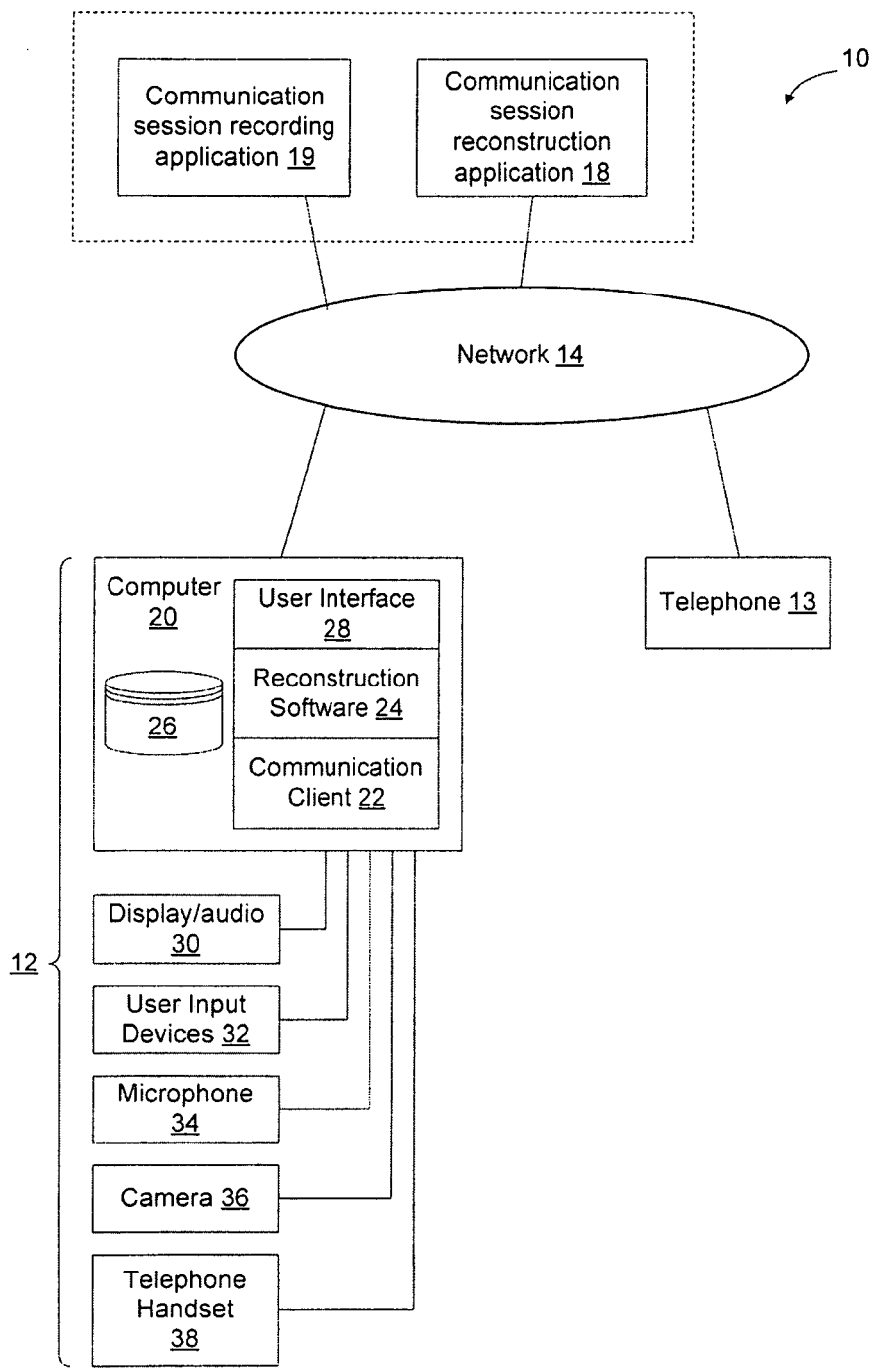
FIG. 1 is a functional block diagram of a portion of an example system that can enable the reconstruction of at least part of a communication session according to an embodiment of the invention.

FIG. 1 shows a portion of an example system 10 that may be used to enable users 12 to communicate with each other and which may also be used to recreate the communication sessions that occur between the users. As shown in FIG. 1, a communication network 14 is provided to enable users to establish communication sessions with each other. The communication network may be any type of communication network such as the Plain Old Telephone System (POTS), the Internet, a corporate network, wireless network, or other type of network. The invention is not limited to the particular type of network selected to enable users to establish and participate in communication sessions with each other.

Communication sessions may be implemented as voice telephone calls, conference calls, video calls, or other types of sessions where users are allowed to speak with each other over a communication network. The communication session may be self-contained or part of a more immersive experience, such as between users participating in a virtual environment. Although an embodiment will be described in which user contributed audio segments are recorded from a standard telephone call, the invention is not limited in this manner as other types of media such as video, shared desktop applications, interactions of Avatars in a virtual environment, and other types of media may be recorded as well and time-stamped and meta-tagged for reconstruction.

According to an embodiment of the invention, each person on a communication session records their own contributions to the communication session. Since the user is recording only their own contributions, the user does not need to get the other users' permission to record on the communication session. Upon request, the user may provide some or all of their recorded contributions to enable the communication session to be recreated at a later point in time. User contributions may be recorded locally or may be recorded by a communication session recording application 19.

In the embodiment shown in FIG. 1, one or more communication session reconstruction applications 18 may be instantiated on the network 14. The communication session reconstruction application may be implemented separate from the recording application or may be integrated with the recording application. The communication session reconstruction application 18 enables communication sessions to be reconstructed by collecting user contributions so that the content of the communication session may be recreated at a later point in time. Although a network-based reconstruction application has been shown in FIG. 1, the reconstruction application may be distributed as well and instantiated on the user computers if desired.

As used herein, the term "reconstructed" implies that at least a portion of the communication session has taken place. The communication need not have ended before reconstruction starts to occur. Thus, participants to a communication session may reconstruct an earlier portion of the communication session while still participating in the same communication session to effectively rewind the live meeting to re-hear what has happened earlier in the meeting. Alternatively, all or part of a previous communication session may be recreated once the communication session has ended. Thus, there are many ways that a communication session can be reconstructed.

Additionally, as set forth below, the communication session reconstruction application may reconstruct all of a communication session, part of a communication session, or only particular aspects of a communication session. For example, it may be desirable to reconstruct a small segment of the communication session. Alternatively, in a video telephone call, it may be desirable to reconstruct the audio aspect of the communication session while ignoring the video aspect. The communication session reconstruction application can be implemented, in one embodiment, to reconstruct only the desired portion and aspect of the communication session. This allows for reconstruction of a selected part of a long meeting, to condense long meetings into shorter reconstructions.

The communication session reconstruction application may also topically collect portions of the communication session that are relevant to a particular topic or which have been flagged in a particular manner by the users as containing information relevant to a particular topic. As the communication session ensues, audio session contributions will be recorded by or on behalf of each user. A timestamp will be associated with each audio session contribution and metadata will be added. The metadata may include who was talking and optionally any data about the topic. The metadata may be entered automatically or may be entered manually.

As shown in FIG. 1, each user 12 has a local communication device that they will use to join the communication session. The local communication device may be implemented using a computer 20 or other device with local recording capabilities. The local communication device may also be a telephone 13 or other such device without local recording capabilities.

Where the local communication device is capable of local file creation and storage, and web access, the local communication device may locally record user contributions to be used for later reconstruction of the communication session. Where the local communication device does not have this capability, or where the user would simply prefer for the recordation to be implemented elsewhere, the user contribution recordation may be implemented by a communication session recordation service deployed on the network. For example, communication session recording application 19 may provide a service of this nature. In either instance, each user's contributions are recorded separately from other user's contributions and remain under the user's control until the user elects to enable other people to have access to their recorded contributions.

In the embodiment shown in FIG. 1, the local communication device used by user 12 is a computer 20 which, in the illustrated embodiment, includes a communication client 22 that that enables the user to participate in communication sessions on the network 14. For example, where the communication session is SIP based, the communication client may be a Voice Over Internet Protocol (VOIP) client that will enable the user to participate in communication sessions on the network. Other types of communication clients such as a communication client built into a virtual environment client may be used as well.

The computer 20 also includes reconstruction software 24 to record user contributions to communication sessions and store the user contributions in a communication contribution database 26. The reconstruction software is also configured to receive requests for communication session contributions, retrieve the requested communication session contributions, and forward user selected communication session contributions to the communication session reconstruction application 18. Similar reconstruction software may be instantiated on the communication session recording application 19 to enable the users to access their session contributions stored by the server to select particular contributions in response to reconstruction requests.

During a communication session, the user's contributions are recorded by the user or on the user's behalf. These contributions remain under the user's control and are not accessible to other users. The recording software enables the user to add metadata to insert tags to the content. The tags may be provided as the recording is occurring, or just afterwards so that users may add tags to events that just occurred. For example, if several people are talking on a communication session and someone makes a comment, anyone may add a tag to the user's contribution after the fact so that the tag is associated with the person's last contribution. The tags may be stored locally or transmitted and stored centrally depending on the implementation.

When a session is to be reconstructed, the user will be requested to provide communication session contributions. The user may elect to provide all requested communication session contributions, some of the requested contributions, or none of the session contributions. For example, during a long meeting, a user may tell a joke that is not particularly relevant to the content of the meeting. While reconstructing the communication session the user that told the joke may opt to not provide the communication session contribution that contains the joke. Other reasons may exist for selecting to not provide particular communication session contributions as well.

A user interface 28 enables the user to interact with the reconstruction software 24, and optionally also with the communication client 22, to enable the user to control the reconstruction software 24. For example, when the reconstruction software 24 receives a request for one or more of the communication session contributions stored in the communication contribution database 26, the user may be provided with an ability to control and/or select which contributions are provided to the communication session reconstruction application 18 via the user interface 28. The user interface may also allow the users to associate tags or notes with particular portions of the communication session to enable those portions of the communication session to be located at a subsequent point in time. The tags/notes may be stored as metadata to enable contributions relevant to a particular topic to be found at a later point in time. When the recording is done by communication session recording application 19, the user may access the server by logging into the server 19 from a computer or via a telephone interface.

In the embodiment shown in FIG. 1, the reconstruction software is implemented separately from the communication client 22. The two pieces of software may be integrated or tightly coupled to enable the two programs to work together. Many ways of allocating responsibility for particular tasks may be implemented and the invention is not limited to an embodiment that splits functionality exactly as shown in FIG. 1. Additionally, as noted above, parts of the software may be implemented as a network service so that the audio recording and audio reconstruction is performed at the network rather than on the local communication device. This enables user contribution via any local communication device, such as a cell phone, ordinary telephone, etc., to be recorded on behalf of the user without requiring the local communication device to support local file creation.

As is common, the computer may be attached to a display 30 and one or more user input devices 32, such as a mouse, touch pad, or keyboard. A microphone 34 may be provided to capture user audio input to a communication session. Similarly, a camera 36 such as an IP camera may be provided to capture user video input to a communication session. A telephone handset 38 may also be used to implement communication sessions. Where the telephone handset is used to communicate on communication sessions, the user's contribution to the communication sessions may be provided to the computer and stored in the communication contribution database so that it is available for later reconstruction of the communication session. Alternatively, as noted above, recording may be implemented by a network service so that user contributions via an ordinary telephone may be recorded on the user's behalf on the network rather than locally on the user's computer.

In operation, whenever the user speaks or contributes other Audio/video input to the communication session, the reconstruction software and/or the communication client will automatically capture that contribution and cause the contribution to be stored in the contribution database 26. In one embodiment, voice activity detection is used to initiate recording of an audio session contribution, which may then be stored as a separate audio file. The start/stop timestamps may be included as part of the filename to make it easy to order the audio files at a later date. Other naming conventions may be used as well. The audio files may be stored in a database or other file system. A new audio file may be created any time the user stops talking for a given period of time. For example, if the user stops talking for a second or two, the system may stop recording and, when the user starts talking again, a new audio file will be created. This allows smaller audio files to be created which facilitates reconstruction in a more granular fashion.

The reconstruction software 24 will associate metadata with the contribution, such as a timestamp and identification information associated with the communication session, to enable the particular contribution to be located at a later point in time. Tags may be entered by the user as well at any time during the communication session.

If it is necessary to later reconstruct the communication session, each participant will be requested to submit their contributions to enable the communication session to be reconstructed. Each participant may elect to contribute whichever portions the like, and only the participant has control over whether to submit the audio session contributions.

Figure 2:
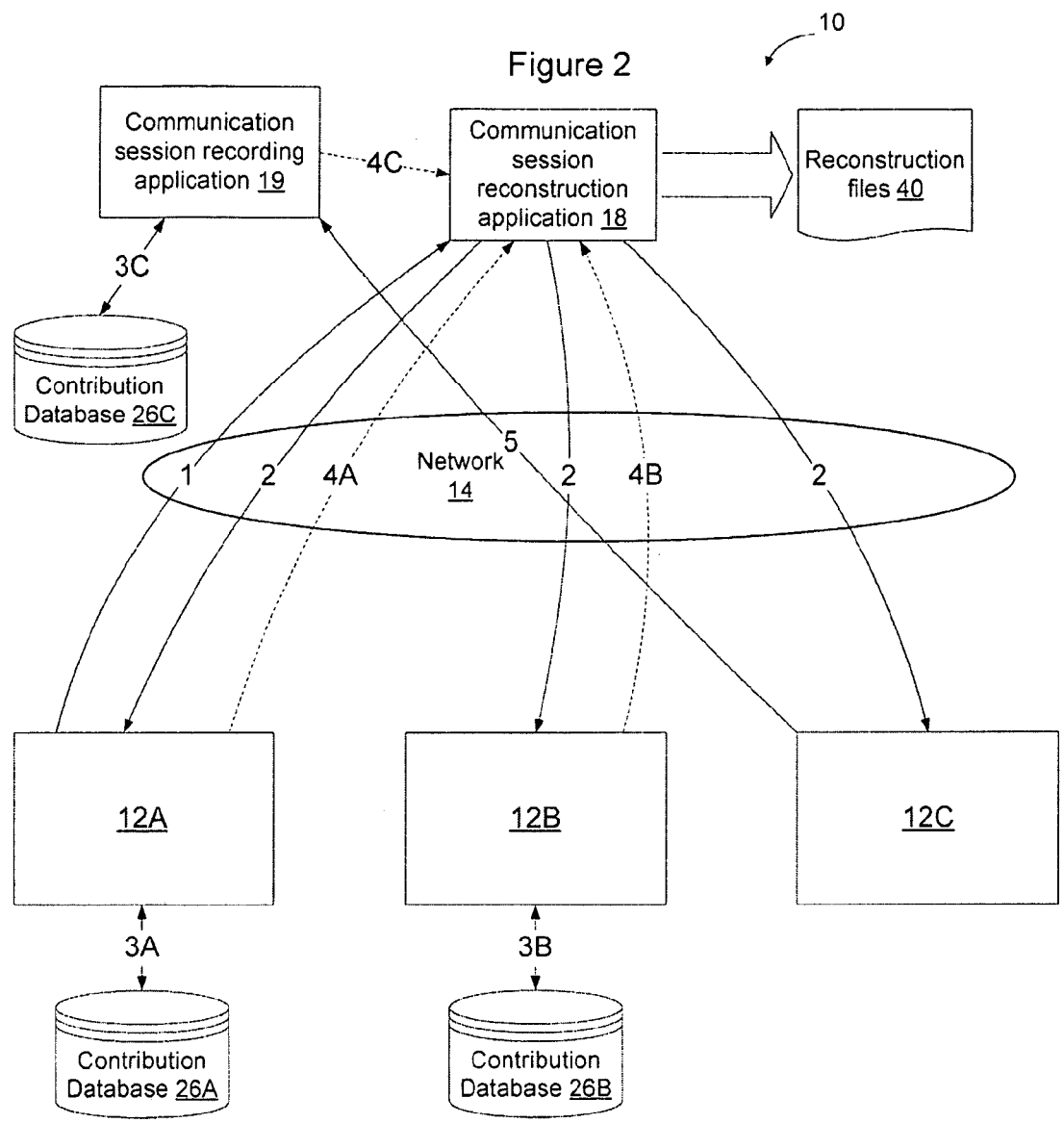
FIG. 2 is a network diagram showing an example process of reconstructing at least part of a communication session according to an embodiment of the invention.

FIG. 2 shows a network diagram and the flow of information that may occur in connection with enabling a communication session to be reconstructed. In the example shown in FIG. 2, it will be assumed that a communication session has taken place and that more than one participant has contributed to the communication session. Hence, reconstruction of the communication session, in this example, will require the communication session reconstruction application 18 to collect contributions from multiple participants to create one or more reconstruction files 40. The reconstruction file(s) contain the contributions of each of the participants that elect to contribute their portions of the audio session. The contributions that are received by the communication session reconstruction application 18 are pieced together to reconstruct all or parts of the original content of the communication session.

The reconstruction file may be a single file that is meta-tagged to provide a timeline of when particular users were speaking. Other information may be added via meta-tags as well. Alternatively, the reconstruction file may be implemented as multiple files that may be played back in a controlled sequence. The reconstruction file may also be reconstructed as a video, where programmatic animations of the photos of the speakers are displayed as they begin talking. The animations may be any desired type of animation, such as by bringing the user's photo to the forefront and possibly showing video of other contextual elements such as a shared document, desktop, or any other reference materials that were discussed at that point in the communication session. Where background materials are to be included in the playback, the document file name or other identifying information may be added as metadata to the user contribution files so that, during playback, the same file may be included in the reconstruction file and used during the reconstruction.

In the embodiment shown in FIG. 2, user 12A will generate a request (arrow 1) to the communication session reconstruction application 18 to initiate reconstruction of a communication session. Although the request (arrow 1) is generated by the user 12A, who may have been a participant on the communication session, the invention is not limited in this manner as the request may come from anyone on the network with access to the server. Various access controls may be implemented to ensure that the person making the request is authorized to do so, and the invention is not limited by the particular way that a request is made or to the particular process involved with enabling a valid request to be made to the communication session reconstruction application 18.

When the communication session reconstruction application 18 receives the request, and decides to implement a reconstruction process, the communication session reconstruction application 18 will send a message (arrow 2) to each of the users requesting that they provide their contributions to the communication session. The message may be broadcast to all users or targeted to only those users likely to have contributions, such as by sending the request to only those users that were known to have contributed during a particular time period during the communication session. The message may specify the particular communication session and a range of time for which communication contributions are requested. Alternatively the message may specify a particular type of tag and request any contributions associated with the particular type of tag. This allows the content specific reconstruction to be accomplished by causing the users to provide contributions relevant to a particular topic (tag) rather than contributions relevant to a particular time period.

Where the contributions are recorded by a network service, such as communication session recording application 19, the contributions to be included in the reconstruction may be identified by the communication session recording application 19 for the users. In this embodiment the users may be provided with a list of proposed contributions and asked to approve of the proposed inclusion of those contributions. The users may then review the contributions, accept inclusion of particular contributions, refuse inclusion of particular contributions, and request that additional contributions be included. For example, as shown in FIG. 2, when the user 12C receives a request to include his contributions in a recordation, the user may access the communication session recording application 19 (arrow 5) to select particular contributions from contribution database 26C (arrow 3C).

Figure 3:
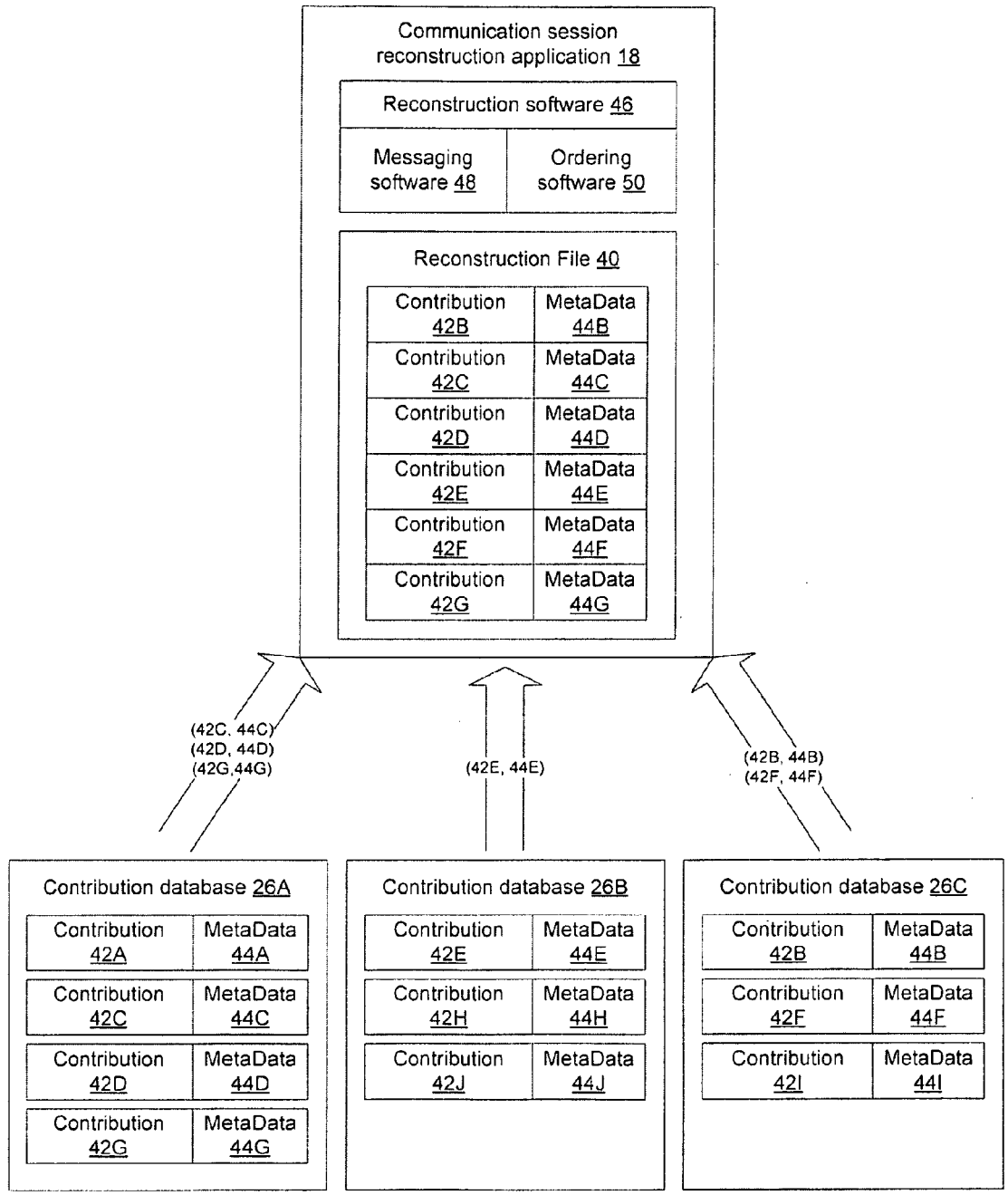
FIG. 3 is a functional block diagram showing components of the system of FIG. 1 interacting to enable at least part of a communication session to be reconstructed according to an embodiment of the invention.

FIG. 3 shows an example of how user contributions may be stored, accessed, provided, and combined, to create a reconstruction file 40. As shown in FIG. 3, each user 12A, 12B, 12C, will maintain a respective contribution database 26A, 26B, 26C. User 12C in this embodiment has used server 19 to maintain his database 26C. The contribution database will include contributions 42, each of which is associated with metadata 44. The metadata describes the data contained in the contribution 42 to enable particular contributions to be located to reconstruct particular communication sessions.

There may be many types of information contained in the metadata 44 depending on the particular way in which communication sessions are to be identified by the communication session reconstruction application 18. For example, each communication session established by the communication client 22 may be assigned an identifier by the reconstruction software 24 running on each user's computer. The identifier assigned by the reconstruction software 24 may be passed to the communication session reconstruction application 18 and correlated by the communication session reconstruction application 18 with the communication session. When it is later necessary to reconstruct the communication session, the communication session reconstruction application may instruct each user to search its database for communication sessions associated with the identifier. Other ways of identifying communication sessions may also be implemented.

The metadata 44 may also include timestamp information related to the time of the contribution. The timestamp data may be roughly synchronized between the users so that the timestamps are relevant to the reconstruction application and enable the reconstruction application to organize the contributions from the respective users to form the reconstruction file 40. Most operating systems support a time synchronization protocol referred to as Network Time Protocol (NTP), either directly or via a helper application. The accuracy of network time protocol is sufficient to enable synchronization between the various users' contributions. To the reconstruction application, the order of the contributions is more important than the exact time when a contribution was provided. Thus, the users need not be synchronized with a high degree of precision. The timestamps may be relative to the beginning of the communication session, to an external time source, or relative to another common reference point, such as a network based reference.

In the example shown in FIG. 3, assume that the message 2 indicated that the communication session reconstruction application was attempting to reconstruct a communication session from a time associated with contribution 42B to a time associated with contribution 42G. The message 2 would specify the time range for the reconstruction and information identifying the communication session that was to be reconstructed. Upon receipt of the message, each user would be provided with a prompt via the user interface to authorize the reconstruction. The user's authorization instructs the reconstruction software 24 on that user's computer to search the contribution database 26 for that user's contributions which have metadata matching the criteria specified in the message (arrow 3 in FIG. 2). Each user will then forward their contributions matching the message criteria to the reconstruction application (arrows 4 in FIG. 2). Where the contribution has been recorded by a recordation server 19, the user will interact with the server 19 or otherwise send an instruction (arrow 5) to the server to cause the server to provide the selected user contributions.

In the embodiment shown in FIG. 3, user 1 has contributions 42C, 42D, and 42G; user 2 has contribution 42E, and user 3 has contribution 42B and 42F that are relevant to the reconstruction process. Assuming that each user authorizes inclusion of their contributions into the reconstruction of the communication session, each user will transmit their respective selected contributions, along with the associated metadata, to the reconstruction application 18.

The reconstruction application in the illustrated embodiment is running reconstruction software 46 containing a messaging software module 48 and an ordering software module 50. The messaging software module is responsible for communication with the users 12, such as generation and reception of the messages shown in FIG. 2. The ordering software is responsible for receiving contributions from the users and stitching the contributions together to form the reconstruction file 40 or ordered set of reconstruction files. Different ways of allocating responsibility between different portions of the reconstruction software may be implemented as well and the invention is not limited to the particular embodiment shown in FIG. 3.

In the embodiment shown in FIG. 3, the reconstruction file may contain the metadata to enable the reconstruction file to be searched at a later point in time for contributions by particular users. Alternatively, the reconstruction file may contain only the contributions or, still alternatively, additional different metadata may be added to the file to enable it to be searched for particular types of content. The invention is not limited to the resultant file format of the reconstruction file. Additionally, video and other external content may be added to the reconstruction file to cause the reconstruction file to be implemented as an audio-visual production.

In the example shown in FIG. 3, user 12A has two contributions that occur right after each other in time. Specifically, user 12A is responsible for contributions 42C and 42D. As shown by this example, the user computers may segment particular contributions into convenient sized chunks to prevent contributions from exceeding a particular file size, particular duration, or in another convenient manner. For example, as a user is talking on a communication session, any time the user pauses for more than a second or two a new file may be created. Voice Activity Detection may be used to determine when a user is speaking. Storing files based on user activity enables separate files to be created whenever the user speaks and avoids recording when the user is not speaking.

Starting a new audio file whenever the user starts speaking also hopefully provides a logical way to divide the user's overall contribution, as users will often pause before beginning a new topic. By starting a new file and, hence, new audio segment contribution, different audio files may be more likely to logically separate by topic, to make it easier at a later date for the user to select which audio files should be provided for a particular desired reconstruction. Although fixed length audio files may be used as well, this is not preferred as the use of fixed length audio segments is more likely to cause the user's contribution to be broken at illogical times, such as in the middle of a sentence, rather than at a natural point in the user's speech. By segmenting the user's participation into multiple shorter contributions, it may be easier to recreate targeted segments of a larger communication session. Optionally, the reconstruction software 24 may stitch these adjacent contributions into a larger single contribution before transmitting the contribution to the communication session reconstruction application 18.

Figure 5:
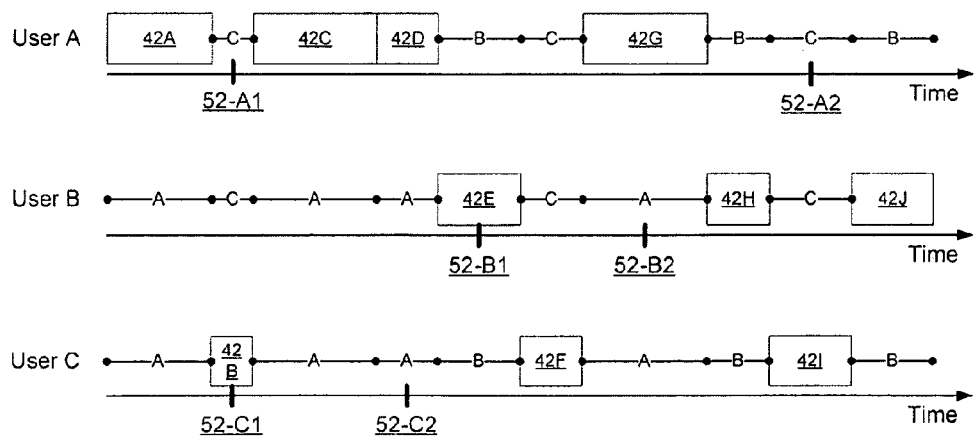
FIG. 5 is a timeline of an example communication session.

Although the contribution databases in FIG. 3 are shown as storing discrete contribution files, alternatively the user's participation in a communication session may be stored as a single file and metadata tags may be inserted into the file to indicate when the user started and stopped talking, and to provide timestamp information within the contribution file. FIG. 5 shows an example of this embodiment. Thus, the invention is not limited to the particular implementation shown in FIG. 3 as many different ways of storing the user's participation in the communication session may be implemented depending on the particular embodiment.

Figure 4:
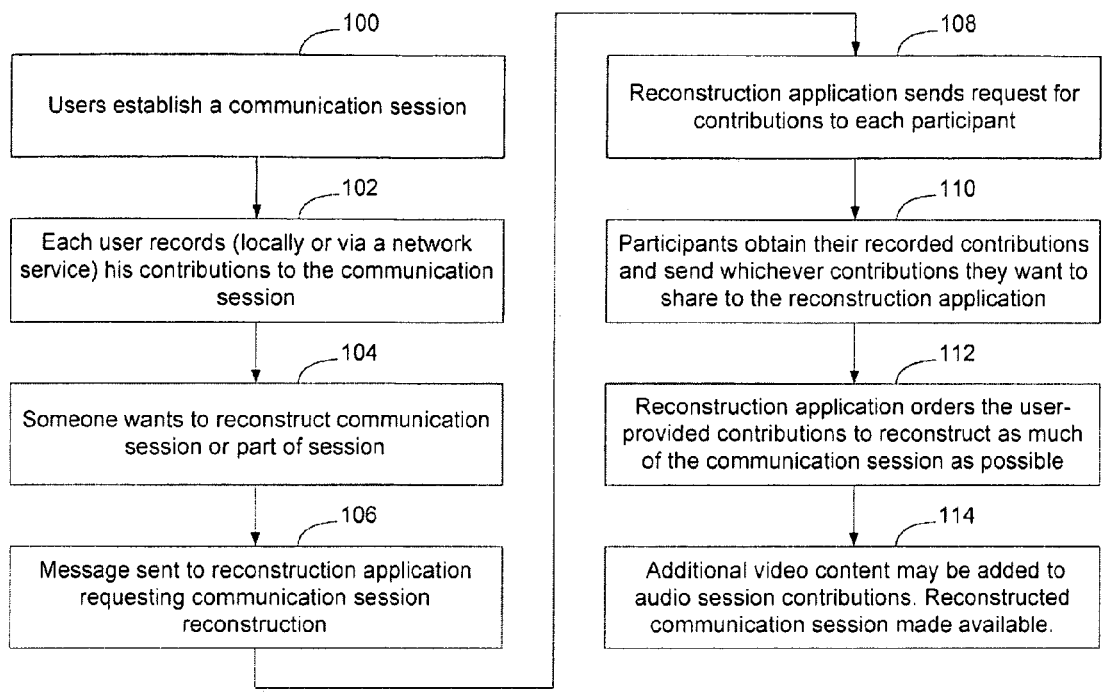
FIG. 4 is a flow chart showing a process of reconstructing at least part of a communication session according to an embodiment of the invention.

FIG. 4 shows a flow chart of a process that may be used to reconstruct communication sessions according to an embodiment of the invention. As shown in FIG. 4, when users establish a communication session (100), each user to the communication session will record his/her own contributions to the communication session (102). Users will only record contributions while actively speaking to conserve storage space. The contributions may be stored locally or may be stored by a network-based recordation server.

At a later time, either during the communication session or upon completion of the communication session, someone may request that the communication session as a whole or that a portion of the communication session be reconstructed (104). Enabling the communication session to be reconstructed while the communication session is occurring enables the participants to play back the communication session in real time to provide a rewind button for the live communication session. Likewise, enabling the communication session to be reconstructed after its conclusion enables the content of the communication session to be accessed at a later time by people who were part of the communication session or by others who were not privy to the communication session.

When a communication session is to be reconstructed, a message (arrow 1 in FIG. 2) will be sent to the reconstruction application requesting that the reconstruction application initiate reconstruction of the particular communication session (106). The reconstruction application will then send a message (arrow 2 in FIG. 2) to each of the participants to request their contributions to the communication session (108).

Each participant will obtain their recorded contributions (arrows 3A, 3B, and 3C in FIG. 2) and send selected recorded contributions to the communication session reconstruction application 18 (Arrows 4 in FIG. 2) (110). Upon receipt of the users' selected contributions, the communication session reconstruction application 18 will order the contributions, to reconstruct as much as possible of the communication session (112). The contributions may be ordered in time order or, alternatively, where the reconstruction request is content based, the contributions may be ordered according to relevance. Other ordering schemes may be employed as well depending on the particular reconstruction to be implemented.

The reconstruction file 40 (or set of files) containing the reconstructed communication session will then be made available (114). Various privacy protections may be associated with the reconstruction file and the invention is not limited by the particular selected access controls that are used to control dissemination of and access to the reconstruction file 40. The file may be a flash file available on a web site or may be implemented using another format. The invention is not limited to the particular format of the reconstruction file. Where the contributions were stored as audio files, the reconstruction file may also be implemented as an audio file. Alternatively, the audio contributions may be put together with other content such as video content, to create an audio-visual presentation. Example video content may include pictures of the person that provided the audio contribution (i.e. the person who was talking), any document referred to and attached to the audio contribution, screen shots of a shared application in use during the original communication session (such as snapshots of a shared electronic whiteboard), or any other desired video content.

Where less than all of the users record their contributions, a reconstruction may contain gaps. Similarly, where one or more of the users does not allow their contributions or particular contributions to be used in the reconstruction, the resultant reconstruction file will contain gaps. There are many valid reasons why a person may elect to not include particular contributions. For example, a reconstruction may be intended to reconstruct only parts of the communication session where a particular topic was discussed. Users may then review their contributions to determine which related to the particular topic, and only provide those particular contributions. As another example, part of the communication session may have been related to discussing personal interests which is not relevant to a reconstruction of the substance of the meeting. Accordingly, users may elect to not provide contributions that are unrelated to the substance of the meeting. As yet another example, a user may have made a somewhat embarrassing comment during the communication session that the user would prefer to not have included in the reconstruction. The user may thus exclude this contribution when responding to a reconstruction request. Accordingly, the invention is not limited to instances where 100% of the users to the communication session elect to record their contributions or elect to provide access to their recorded contributions during the reconstruction process. A gap, in this context, refers to a portion of the communication session that is not able to be reproduced because of a lack of content for a particular period of time.

The reconstruction may occur after the meeting has concluded or may occur while the communication session is on-going. Thus, near-real time reconstruction may occur i.e. with a short delay (such as 3-5 second delay) to enable users to censor particular comments before the audio files are recorded. Additionally, minutes may be taken automatically or manually and added to the audio recording files which may be viewed by the users as the meeting progresses. The minutes may be manually corrected as well to enable a more accurate record of the meeting to be created. Optionally, various controls may be provided to the user such as to provide the user with the ability to stop recording, or to otherwise control how their contribution is being recorded.

Although particular modules have been described in connection with FIGS. 1-4 as performing various tasks associated with enabling communication sessions to be reconstructed, the invention is not limited to this particular embodiment as many different ways of allocation functionality between software components instantiated on the user computers 12, communication session recording application 19, and communication session reconstruction application 18 may be implemented. Thus, the particular implementation will depend on the particular programming techniques and software architecture selected for its implementation and the invention is not intended to be limited to the one illustrated architecture.

FIG. 5 shows a timeline of an example communication session involving three users (user A, user B, and user C). The contributions of each of the users in the example communication session of FIG. 5 are the same as the contributions shown in the contribution databases of FIG. 3. Thus, the example communication session of FIG. 5 may be used to create the contribution entries recorded in the contribution databases.

In the example shown in FIG. 5, each user has a running recordation of their portion of the communication session. During the portion of time when the user is speaking, the user's speech is recorded as a contribution. For example, user A is speaking during the first interval shown in FIG. 5. Thus, a contribution 42A will be recorded for user A. The other users will not record the content of User A's contribution, but will record an indication that user A was contributing. When user A stops contributing, user C will start talking. This is recorded in user C's contribution database as contribution 42B. The other users will not record user C's contribution but will record an indication that user C was contributing. In this manner, each user may maintain a running recordation of the communication session, but only actually record the substance of the communication session when the respective user is contributing.

In the example shown in FIG. 5, each user is also allowed to add tags to the recordation of the communication session. The tags may indicate many different types of things, such as action items, minute items, important points, or other types of flags that may help the users return to particular points of the communication session. The tags may be entered by the users via the user interface 28 and entered into the recordation of the communication session by the reconstruction software 24. Additionally, users may be allowed to enter free-text comments or notes during the communication session.

The tags may be used to select portions of the communication session for inclusion into a reconstruction file 40. For example, a particular user may be tasked with creating minutes from the communication session. The user may send a request to the reconstruction application for the portions of the communication session that were flagged by the users as containing points that those users felt should be included in the minutes. The reconstruction application may collect the contributions from the users that were tagged using the tags 52 to enable a compilation of the relevant contributions to be collected and presented in a single reconstruction file. Similarly, during a long communication session, many different topics may be discussed between a team of individuals. The team may decide on particular action items that are to be executed upon completion of the communication session. One or more of the users that is participating in the communication session may add tags 52 whenever responsibility for an action item is allocated. Upon completion of the communication session, a request may be sent to the reconstruction application to collect all action items. The reconstruction application may send a request to each of the users, which will cause the users to obtain and transmit contributions associated with action items. The reconstruction application may combine the contributions into a reconstruction file to enable a recordation of the action items to be made available in a compact convenient manner. Other examples may be envisioned as well.

The communication sessions may be implemented between users of a communication network such as the Internet or a telephone network. The communication sessions may also be implemented as part of a user's participation in a three dimensional computer-generated virtual environment. The invention is not limited to the particular way in which the communication session is implemented or the on-line context of the users.

The functions described above may be implemented as one or more sets of program instructions that are stored in a computer readable memory and executed on one or more processors within on one or more computers. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a memory chip, computer memory, memory stick, disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A computer-implemented method of reconstructing at least a portion of a communication session, the method comprising the steps of:
    recording contributions of a plurality of participants to a communication session as a plurality of independently recorded participant contributions during the communication session, each independently recorded participant contribution containing content contributed only by a respective participant during the communication session;
    maintaining each of the independently recorded participant contributions under control of the respective participant who contributed the content of the independently recorded participant contribution;
    after the communication session has begun, transmitting a request to at least a subset of the plurality of the participants for permission to include the independently recorded participant contributions of the subset of the plurality of participants in a reconstructed portion of the communication session;
    receiving permission from respective participants to include at least a subset of the requested independently recorded participant contributions in the reconstructed portion of the communication session; and
    after receiving permission to include the subset of requested independently recorded participant contributions, combining only the subset of the requested independently recorded participant contributions for which permission has been received to create the reconstructed portion of the communication session, the created reconstructed portion of the communication session including portions of at least two of the independently recorded participant contributions.

2. The method of claim 1, wherein each independently recorded participant contribution contains audio contributed by that particular participant which has been recorded by that particular participant or under control of that particular participant during the communication session.

3. The method of claim 1, wherein each independently recorded participant contribution is time-stamped, wherein the request specifies a time range, and wherein the request requests the participants to submit independently recorded participant contributions to the communication session during the specified time range.

4. The method of claim 1, wherein each independently recorded participant contribution includes meta-data describing a content of the contribution, wherein the request specifies a topic, and wherein the request requests the participants to submit independently recorded participant contributions containing content relevant to the topic.

5. The method of claim 1, wherein the step of combining the received independently recoded participant contributions further comprises adding additional content to create a reconstruction of the portion of the communication session.

6. The method of claim 5, wherein the independently recorded participant contributions are audio files, and wherein the additional content comprises visual information relevant to the participants of the communication session.

7. The method of claim 1, wherein the step of combining the received recoded participant contributions to reconstruct the portion of the communication session comprises creating a file containing the subset of requested independently recorded participant contributions for which permission has been obtained or an ordered series of files containing the contributions.

8. A computer-implemented method of participating in a communication session by a user to enable later reconstruction of the communication session;
    the method comprising the steps of:
    independently recording, by the user, audio contributions made by the user to the communication session;
    maintaining, by the user, the audio contributions under the control of the user;
    after the communication session has started, selecting, by the user, a subset of the independently recorded audio contributions for inclusion in a reconstruction of the communication session; and
    providing permission, by the user, for the selected subset of the independently recorded audio contributions to be included in the reconstruction of the communication session; and
    after receiving permission to include the subset of requested independently recorded participant contributions, combining the subset of the requested independently recorded participant contributions for which permission has been received with independently recorded participant contributions from at least one other user to create the reconstructed portion of the communication session.

9. The method of claim 8, wherein the communication session is a telephone conference call, wherein the independently recorded audio contributions comprise files containing recordings of speech generated by the user during the telephone conference call such that each user only records speech generated by themselves on the telephone conference call.

10. The method of claim 9, wherein the independently recorded audio contributions are recorded by the user locally.

11. The method of claim 9, wherein the independently recorded audio contributions are recorded by the user via a network-based recording service such that the independently recorded audio contributions are recorded remotely from the user but under the control of the user.

12. The method of claim 9, further comprising adding, by the user, metadata to the independently recorded audio contributions.

13. The method of claim 12, wherein the metadata comprises notes related to the content of the independently recorded audio contributions.

14. The method of claim 9, wherein each independently recorded audio contribution is timestamped.

15. The method of claim 9, wherein the step of making the subset of the independently recorded audio contributions available for inclusion in the reconstruction of the communication session comprises transmitting or causing to be transmitted the selected subset of the independently recorded audio contributions to a reconstruction process responsible for creation of a communication session reconstruction.

16. The method of claim 9, further comprising the step of recording, by the user, video contributions made by the user to the communication session.

17. A computer-implemented method of enabling a plurality of participants in a communication session to collectively record the communication session, the method comprising the steps of:
- independently recording, by each of the participants to the communication session, the participant's respective contributions to the communication session as independently recorded contributions;
- maintaining, by each of the participants to the communication session, control over the participant's independently recorded contributions;
- upon completion of the communication session, selecting, by at least a subset of the participants to the communication session, independently recorded contributions to be included in a collective recreation of the communication session;
- providing permission, by the subset of the participants to the communication session, to allow only the selected independently recorded contributions to be included in the collective recording; and
- after receiving permission to include the selected independently recorded contributions, combining only the selected independently recorded contributions for which permission has been received to create a reconstructed portion of the communication session, the created reconstructed portion of the communication session including selected independently recorded contributions of at least two of the participants.

18. The method of claim 17, wherein the step of providing permission occurs upon completion of the communication session.

* * * * *